Dec. 22, 1964   T. GIZESKI   3,162,365
DIGITAL CONTROL SYSTEM
Filed March 1, 1961   4 Sheets-Sheet 1
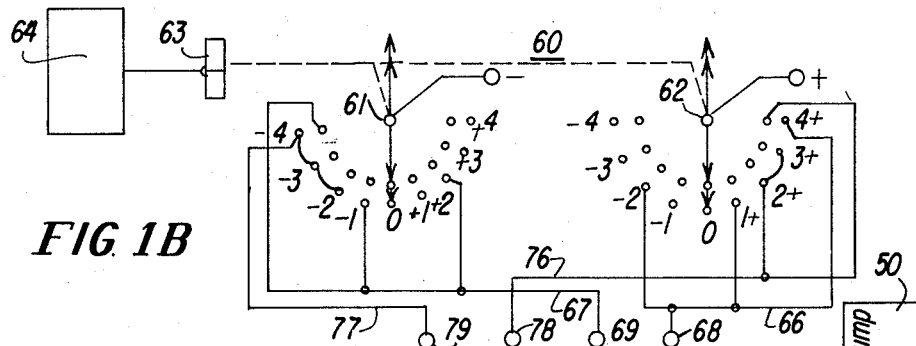
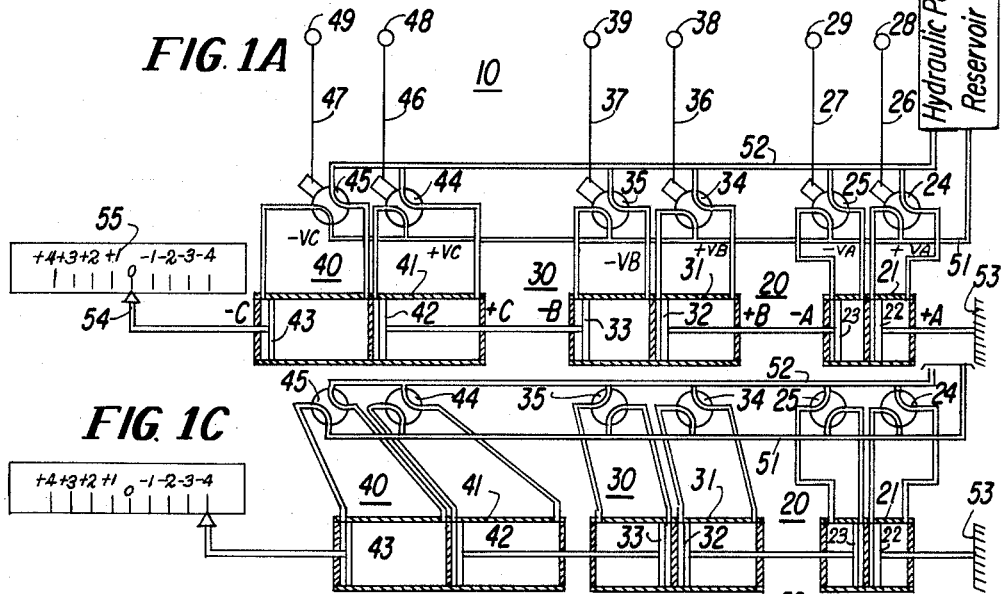
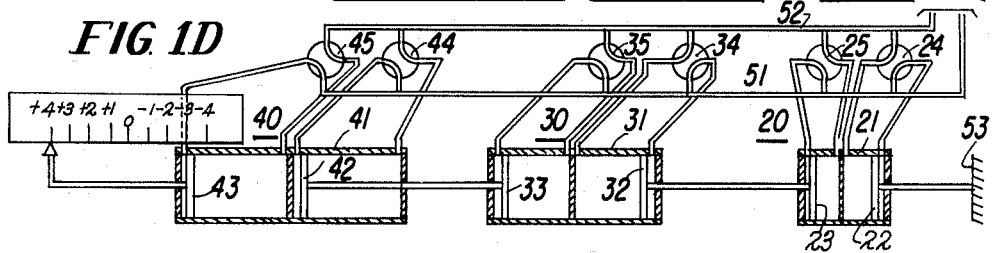
INVENTOR.
TERRENCE GIZESKI
BY
ATTYS.

Dec. 22, 1964  T. GIZESKI  3,162,365
DIGITAL CONTROL SYSTEM
Filed March 1, 1961  4 Sheets-Sheet 2

FIG. 2 — Activation Pattern According to Ternary Progression.

FIG. 3 — Activation Pattern According to Reflected Binary Progression.

INVENTOR.
TERRENCE GIZESKI
ATTYS.

Dec. 22, 1964     T. GIZESKI     3,162,365
DIGITAL CONTROL SYSTEM
Filed March 1, 1961     4 Sheets-Sheet 3
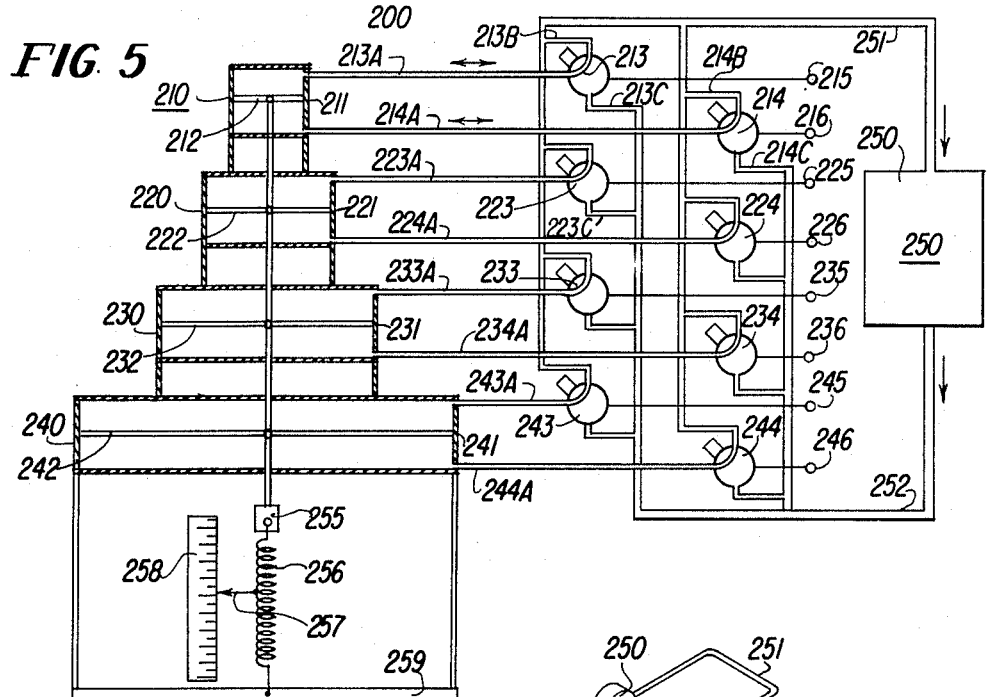
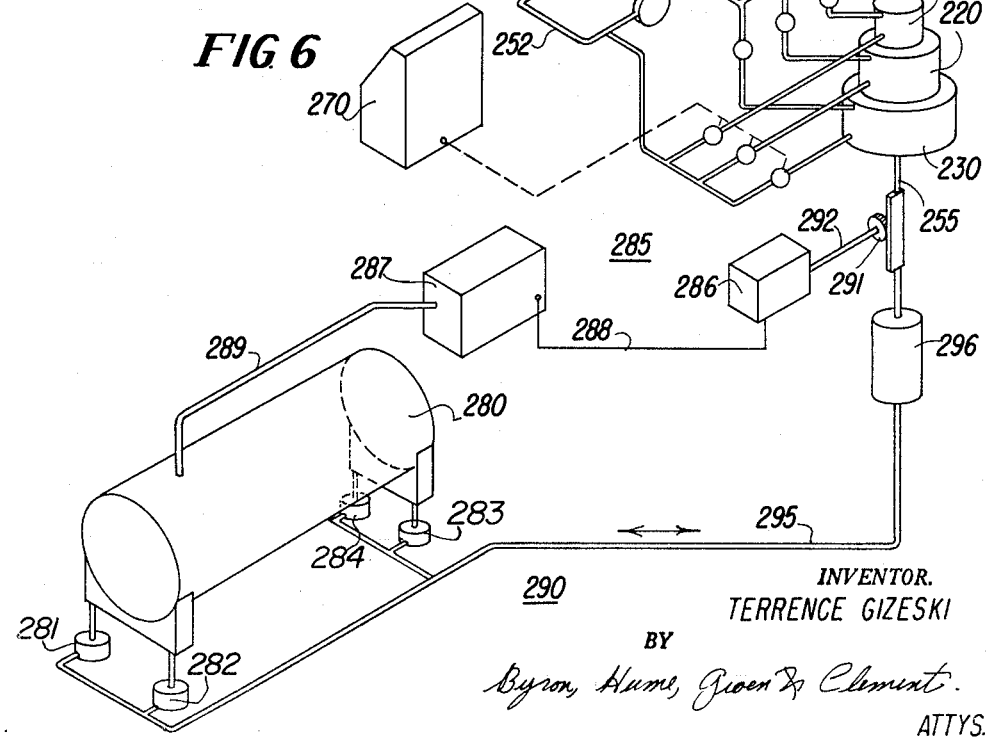
INVENTOR.
TERRENCE GIZESKI
BY
Byron, Hume, Groen & Clement
ATTYS.

Dec. 22, 1964     T. GIZESKI     3,162,365
DIGITAL CONTROL SYSTEM
Filed March 1, 1961     4 Sheets-Sheet 4
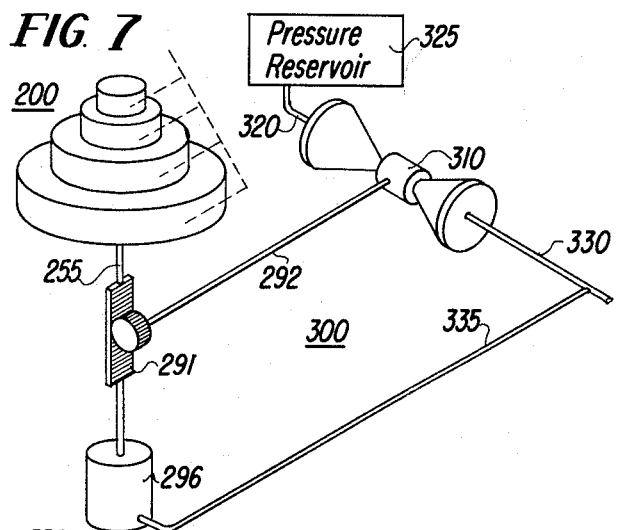
FIG. 7
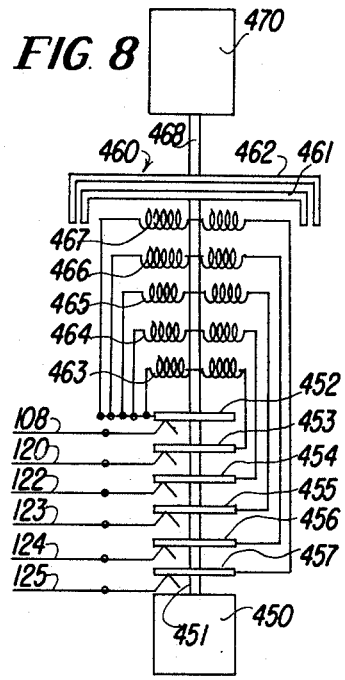
FIG. 8
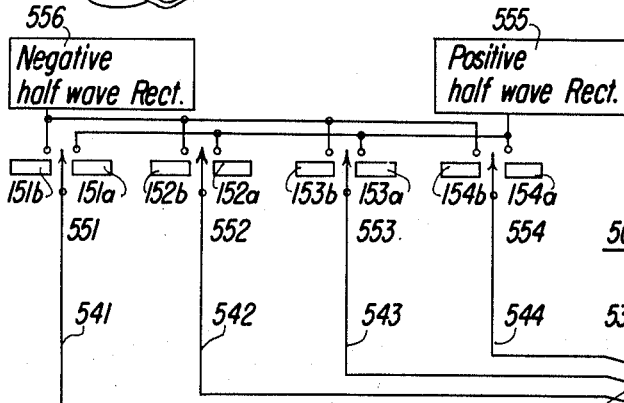
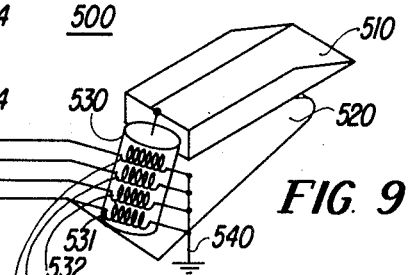
FIG. 9
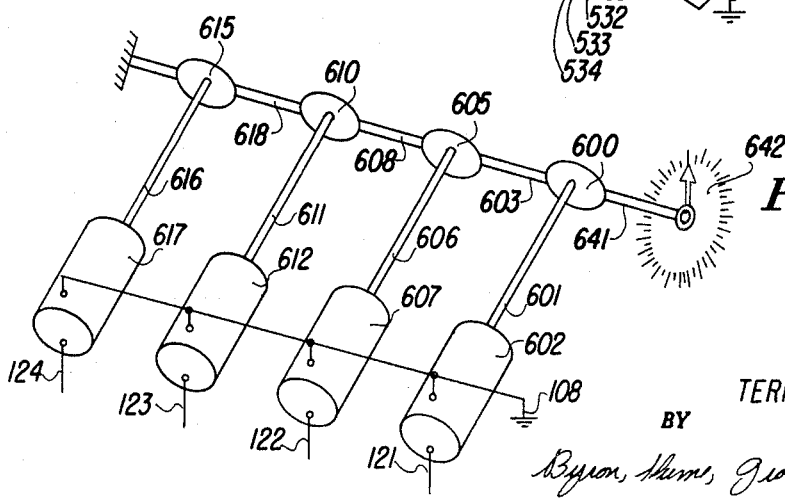
FIG. 10
INVENTOR.
TERRENCE GIZESKI
BY
Byron, Hume, Groen & Clement.
ATTYS.

United States Patent Office 3,162,365
Patented Dec. 22, 1964

3,162,365
DIGITAL CONTROL SYSTEM
Terrence Gizeski, 11357 S. Normal, Chicago, Ill.
Filed Mar. 1, 1961, Ser. No. 92,572
11 Claims. (Cl. 235—209)

The present invention relates to digital control systems for dynamical operators and particularly to control systems and dynamical operators of the type that conform operatively to a ternary progression. By the term "digital control systems" is meant a control arrangement which provides a plurality of control points differing progressively from one another by uniform discrete increments. By the term "dynamical operator" is meant a device, installation or apparatus that is operated by means of physical force or energy and in the present circumstance is contemplated to embrace digital positioners, digital regulators, digital speed transmissions and digital force mechanisms. The term "ternary progression," as employed in the present circumstance, is meant to embrace a system including a plurality of elements or bits each of which is selectively operative into anyone of three conditions and which bits are operative individually and collectively according to a progressive pattern to effect differences that are digitally related.

In the present state of technical development, it is most convenient to accomplish automatic control of a dynamical operator, a furnace, for example, by utilizing a digital programmer which provides on a time basis digital signals corresponding to the desired liquid fuel flow to the furnace at any given time. However, the flow of fuel to the exemplary furnace is usually administered through a regulating control valve, generally classifiable as an analog device. As an analog device, it does not in itself recognize digital control designations, in this instance port area openings, hence cannot be made to be directly responsive to digital signals. Accordingly, to make the digital programmer adaptable to the analog control, it is necessary to include a digital-to-analog converter which thus adds further to the complexity and expense of the system.

To meet this objection, control elements have been provided which in themselves are directly responsive to digital input signals for providing a digital output control. However, for practical reasons, the usage of such equipment is limited to the circumstance where but a few digital control points are required. A further solution to the problem is to employ in combination a nominal number of similar binary control units in which each control unit is adjusted to perform a regulating function corresponding to an integer portion in a binary progression. Such a system is disclosed in my copending application, Serial No. 842,165, filed on September 24, 1959, now Patent 3,072,-146, entitled "Digital Regulator Valve." However, even though this system goes a long way toward solving the problem of adequate digital control, it suffers a practical limitation in the number of digital control points that can be provided.

It is a general object of the present invention to provide an improved digital control system and improved digital control elements that will accommodate the multiplicity of digital control points, approaching the flexibility of analog control, with a minimum amount of necessary equipment.

A more specific object of the invention is to provide a new and improved regulating control arrangement which may be controlled directly from digital signals and in a ternary progression pattern in a manner so as to achieve a wide range of selective digital controls with a minimal amount of required equipment.

A further object of the invention is to provide in a control system a digital regulator arrangement made up of a nominal number of similar ternary control units in which each unit is adjusted so as to perform in composite a regulating function corresponding to an integer portion in a reflected binary progression, and wherein digital regulating operation is performed by the regulator arrangement in conjunction with an accumulator and by means of individual and collective operation of the ternary control units.

Another object of the invention is to provide a new and improved regulating control arrangement which may be controlled directly from a digital signal source and in a reflected binary progression pattern in a manner so as to achieve digital control with a minimum amount of required equipment and with a maximum amount of response and sensitivity.

A more specific object of the invention is to provide in a control system including a digital programmer having $3^n$ discrete incremental control signals and including a digital control element, a series of $n$ number reversible vector suppliers bearing specific vectoral relationships to one another wherein the vector output of any one of the suppliers in this series is three times that vector output of the next preceding supplier in a series, a vector accumulator intermediate the reversible vector suppliers and the digital control element whereby $3^n$ number of discrete incremental vector outputs are available for application directly to the digital control element, and a control connection between the digital programmer and the reversible vector suppliers arranged in a manner so as to correlate the digital output of the vector accumulator to the digital output of the programmer.

A more specific object of the invention is to provide in a control system including a digital programmer having $2^{n-1}$ discrete incremental control signals and including a digital control element, a series of $n$ number reversible vector suppliers bearing specific vectoral relationships to one another, a vector accumulator intermediate the reversible vector suppliers and the digital control element whereby $2^{n-1}$ of discrete incremental vector outputs are available for application directly to the dynamical control element, and a control connection between the digital programmer and the vector suppliers arranged in a manner so as to correlate the digital output of the vector accumulator to the digital output of the programmer.

Further objects and features of the invention pertain to the particular structural arrangements whereby the above outlined objects are achieved. The invention, both as to its principles and mode of use, will be better understood by reference to the following specification and drawings forming a part thereof wherein:

FIGURE 1A is a schematic representation of a linear digital positioner in accordance with the principles of the invention;

FIGURE 1B is a schematic representation of an exemplary control circuit for partially operating the arrangement of FIGURE 1A;

FIGURE 1C shows the arrangement of FIGURE 1A when operated by the circuit of FIGURE 1B to one extreme condition;

FIGURE 1D shows a representation of the arrangement of FIGURE 1A when operated by the circuit of FIGURE 1B to the other extreme condition;

FIGURE 2 is a plot of activation arrangements for the devices in FIGURE 1A in accordance with a ternary progression pattern;

FIGURE 3 is a plot of operational arrangements for the units of FIGURE 1A laid out in accordance with a reflected or gray binary progression;

FIGURE 5 is a schematic representation of a force mechanism utilizing the principles of the present invention;

FIGURE 6 is a digital scale arrangement utilizing the force mechanism shown in FIGURE 5;

FIGURE 7 is a digital pressure regulator utilizing the force mechanism of FIGURE 5;

FIGURE 8 is a magnetic coupler arrangement for providing a digitally controlled electric transmission in accordance with the principles of the present invention;

FIGURE 9 illustrates a variable amplitude digital feeder made in accordance with the principles of the present invention; and FIGURE 10 shows an angular digital positioner utilizing the principles of the present invention.

Figure 4:
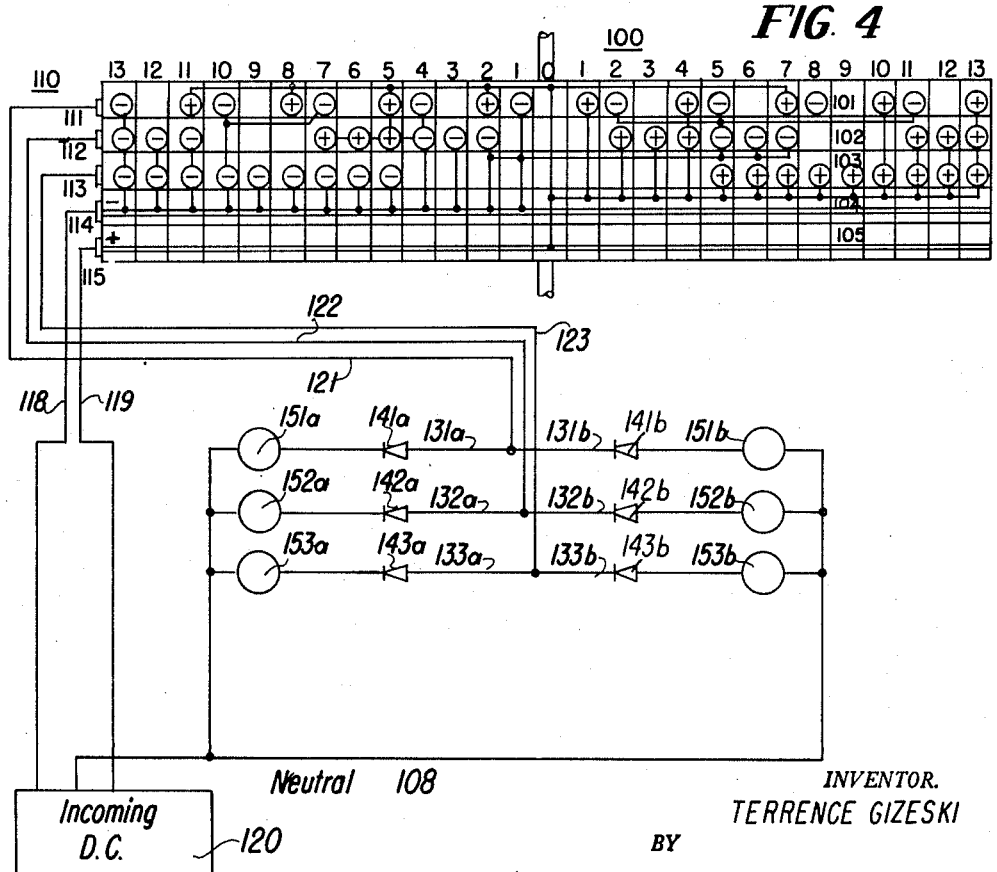
FIGURE 4 is an alternative circuit for operating the devices in accordance with the invention.

Regulation in any type of a control system is actually the controlled selection of a fraction of a total range or spectrum of performance capable in the system. Performance might be measured, for example, as a function of the total area, distance, force, pressure, speed, flow, torque, or work or power, to cite some of the various standards by which dynamical units can be measured. To give a specific example, in the case of a linear positioner, the ultimate control that can be provided is determined by the total stroke through which the positioner can be moved.

In order to provide digital regulation from a dynamical unit such as a linear positioner the devices which go to make up that positioner must be arranged or proportioned to cooperate progressively and in definite steps so that each step in the progression will be the same. This defines digital control. To provide digital control of any consequence, and for purposes of obtaining control accuracy, it is necessary to provide a multiplicity of control points. In the case of a linear positioner, it has been found that a number of control devices, such as pistons, can be employed to provide a multiplicity of control points if the stroke of the pistons are proportioned to conform to an integer of a mathematical progression. The mathematical progression employed is actually dependent upon the nature of the control device, for example, in the case of the ordinary piston which is a binary of nature, maximum flexibility is achieved if a normal binary progression is employed in the operation of a plurality of such devices. However, where a double piston cylinder, such as shown in FIGURE 1A is employed, there is a possibility presented of a three-position or ternary device. In this circumstance, greater flexibility is achieved if a ternary progression is employed. For example, in the three unit linear position as shown in FIGURE 1A, the total stroke $S_t$ would be equal to the sum of the individual strokes, and the length of the stroke $S_x$ provided by the piston X is:

$$S_x = \frac{3^{x-1}}{3^{n-1}} \cdot \frac{S_t}{3}$$

where $n$ equals the number of piston devices in the assembly.

In an arrangement having such proportionate relationships, $3^n$ linear regulating control points are available by operating the units in proper combinations and in proper sequence. Thus in a three unit system, twenty-seven linear regulating control points can be achieved. In a system where greater accuracy or a greater number of linear regulating control points is required, an increased unit system may be employed and a five unit system will yield two-hundred forty-three control points. A better understanding of this mathematical consideration will be had from a review of the arrangement shown in the drawings.

Referring to FIGURE 1A, there is shown therein a linear digital positioner 10 including a piston cylinder unit 20, a piston cylinder unit 30 and a piston cylinder unit 40, a hydraulic reservoir and pump unit 50 and a linear scale 55. The piston cylinder unit 20 includes a divided cylinder unit 21 carrying in the one chamber thereof a piston 22 and carrying in the other chamber thereof a piston 23. Associated with the piston 22 is a selectively operative four-way valve 24 and associated with the piston 23 is a selectively operative four-way valve 25. The valves 24 and 25 are associated with the hydraulic pump and reservoir 50 by means of the flow conduits 51 and 52 for operating the corresponding pistons 22 and 23 alternately between their retracted and extended positions. For purposes of later explanation, the cylinder unit is given the alternate designation character of A with that portion of the cylinder associated with the piston 22 having the alternate designation character +A and that portion of the cylinder associated with the piston 23 having the alternate designation character −A.

The piston cylinder unit 30 includes the evenly divided cylinder portion 31 including in one chamber thereof a piston 32 and in the other chamber thereof a piston 33. Associated with the piston 32 by means of suitable hydraulic conduits is a four-way valve unit 34 and associated with the piston 33 by an appropriate hydraulic conduit is a four-way valve unit 35. The valve units 34 and 35 are supplied from the hydraulic pump and reservoir 50 by means of the conduits 51 and 52. The valve 34 is actuated via a conductor 36 from a terminal connection 38. Similarly, the valve 35 is actuated from a conductor 37 from a terminal 39.

The piston cylinder unit 40 is made up of an evenly divided cylinder 41 carrying in one chamber thereof a piston 42 and carrying in the other chamber thereof a piston 43. Associated with the piston 42 by appropriate hydraulic conduits is a four-way valve 44 and associated with the piston 43 by appropriate hydraulic conduits is a four-way valve 45. As with the other valves, the valves 44 and 45 are connected via the hydraulic conduits 51 and 52 to the hydraulic pump and reservoir 50. The valve 44 is actuated via a conductor 46 from a terminal 48 and the valve 45 is actuated via a conductor 47 from a terminal 49.

In the arrangement of FIGURE 1A, the pistons 22 and 23 of the cylinder 21, the pistons 32 and 33 of the cylinder 31 and the pistons 42 and 43 of the cylinder 41, act opposite to one another in their separate chambers. Further, as illustrated, the piston 22 is connected by its shaft to a fixed reference place here illustrated by the numeral 53, the piston 23 of the cylinder 21 and the piston 32 of the cylinder 31 are joined by a common shaft, and the piston 33 of the cylinder 31 and piston 42 of the cylinder 41 are joined by a common shaft. The piston 43 of the cylinder 41 has connected thereto on its shaft the element to be positioned here represented by a pointer 54, which is utilized with reference to a linear scale 55. In the schematic arrangement of FIGURE 1A, it is understood that the cylinders 21, 31 and 41 are visualized as being movable with reference to the base 53 thereby to contribute motion to the pointer 54.

For purposes of easier explanation hereinafter, it is to be noted that the cylinders 21, 31 and 41, respectively, have been given the alternative designation characters of A, B and C, respectively. In the cylinder 21, that portion associated with the piston 22 has been given the alternative designation character +A and that portion associated with the piston 23 has been given the alternative designation character −A. In the cylinder 31, that portion thereof associated with the piston 32 has been given the alternative reference character +B and that portion associated with the piston 33 has been given the alternative reference character −B. Similarly, in the cylinder 41, that portion thereof associated with the piston 42 has been given the alternative reference character +C and that portion associated with the piston 43 has been given the alternative reference character −C. In keeping with this alternative designation, it is to be noted that the valves 24 and 25 have been given the alternative designations, respectively, +VA and −VA. Similarly, the valves 34 and 35 have been given the alternative reference designations +VB and −VB, respectively, and the valves 44 and 45 have been given the alternative designations +VC and −VC, respectively.

In the piston arrangements of FIGURE 1A, the strokes of the pistons in the cylinders 21, 31 and 41 are proportioned in accordance with the determination set forth above. Specifically, the stroke of the pistons 32 and 33 in the cylinder 31 are each three times the length of the stroke of the pistons 22 and 23 in the cylinder 21 and the stroke of the pistons 42 and 43 in the cylinder 41 is three times the stroke of the pistons 32 and 33 in the cylinder 31. Thus the cylinders 21, 31 and 41 bear a relationship in stroke length of 1:3:9. Each of the cylindrical units can be operated into one of three positions so that cylindrical units 21 and 31, when operated in combination, can be operated into nine digital linear positions and the cylindrical units 21, 31 and 41, when operated in combination, can be operated into any one of twenty-seven linear digital positions.

FIGURE 1B sets forth, by way of example, electrical circuitry that can be employed with the arrangement of FIGURE 1A for purposes of effecting linear digital positioning. The electrical circuitry thereof is shown to be adapted only for operating two of the three cylindrical units. However, it is understood that operation of a third cylindrical unit and the fourth cylindrical unit can be interpolated from the explanation given hereinafter. Therein there is shown a stepping switch 60 including a first set 61 of double contacts and wipers and a second set 62 of double contacts and wipers. The stepping switch is operated by means of a stepping relay 63 which is selectively operable from a control mechanism 64.

Each of the banks of contacts as illustrated in FIGURE 1B includes nine double contacts, and the wiper for the set 61 is connected to a negative potential while the wiper for the set 62 is connected to a positive potential. For purposes of easier explanation, the contacts in the sets 61 and 62 have been numbered consecutively from −4 to +4 and this numbering matches that of the indicator 55 shown in FIGURE 1A. The wipers of the sets 61 and 62 are stepped consecutively in accordance with the operation of the stepping relay 63 for purposes of applying negative potential and positive potential respectively to the contacts in the sets 61 and 62. For providing energizing signals to the terminals 28, 29, 38 and 39 of FIGURE 1A, there is provided, respectively, terminals 68, 69, 78 and 79 connected via conductors 66, 67, 76 and 77, respectively, to appropriate contacts in the sets 61 and 62. The conductors 66 and 76 are connected to a particular one of the contacts in the banks of the set 62 and the conductors 67 and 77 are connected to particular ones of the contacts in the banks of the set 61, both as shown. Connections are made in accordance with the pattern set forth in the ternary progression layout of FIGURE 2 and particularly for the units A and B thereof.

For the wiper position of the sets 61 and 62 shown in FIGURE 1B, the cylindrical piston arrangements 20, 30 and 40 of FIGURE 1A, will be operated in the manner as shown. Specifically, each of the four-way valves 24, 25, 34, 35, 44 and 45 will be in their normal positions thereby forcing hydraulic liquid into the associated piston chambers in a pattern so that piston 22 is retracted, piston 23 is extended, piston 32 is retracted, piston 33 is extended, piston 42 is retracted and piston 43 is extended. The pointer 54 will then be in position 0 relative to the scale 55.

However, should the wipers of the sets 61 and 62 be stepped so as to engage contacts −4 thereof, the control signal will be extended via the conductors 67, terminal 69, terminal 29 and conductor 27 to the valve 25 for operating the valve thereof into its other position, and similarly a signal will be extended via the conductor 77, terminals 79 and 39 and conductor 37 to a valve 35 for operating valve into its other condition. Thereupon the hydraulic flow in the piston chamber associated with the piston 23 will be reversed and the hydraulic flow in the piston chamber associated with the piston 33 will be reversed causing the piston 23 to be retracted and the piston 33 to be retracted. This condiution is shown in the partial representation of FIGURE 1C. In this condition, the indicator 54 will be moved to position −4 on the scale 55 thereby indicating a new linear position.

By way of further example, should the wipers of the sets 61 and 62 be stepped to engage the contacts +4 in the banks thereof, the control signals will be relieved from the conductors 67 and 77 thereby causing the valves 25 and 35 to restore to their initial state and control signals will be applied to the conductors 66 and 76 for changing the control condition of the valves 24 and 34. Specifically, a signal is sent via the conductor 66, terminals 68 and 28, and conductor 26 to the valve 24 for operating the valve thereof into its other state and a signal sent via the conductor 76, terminals 78 and 38 and the conductor 36 to the valve 34 to operate that valve into its other state. Thereupon the hydraulic flow through the piston chambers associated with the pistons 22 and 32 will be changed so as to cause the pistons 22 and 32 to move from their retracted position to their extended position thereby moving the entire cylinder arrangement to cause the pointer 54 to indicate the numeral +4 on the linear scale 55. This condition is illustrated in FIGURE 1D.

In this same manner, stepping of the wipers in the sets 61 and 62 into engagement with others of the contacts in the banks thereof, will cause corresponding changes in the operative states of the valves and piston cylinders so as to cause a movement of the pointer 54 to indicate a linear position corresponding to the digital position selected on the bank of contacts.

It is understood that it has been selected to illustrate operation of only two of the piston cylinders in order to make the understanding thereof more easy and that operation of the total arrangement including the piston cylinders 21, 31 and 41 could be accomplished by increasing the number of contacts in the banks of the sets 61 and 62 from nine in number to twenty-seven in number and connecting the contacts thereof in a pattern as shown in FIGURE 2.

In this schematic illustration of FIGURES 1A to 1D, it is to be understood that the pointer 54 and indicator scale 55 are employed only for purposes of better illustrating the positioning function provided by the device and that in practice the shaft of the piston 43 would be in fact connected to any type of element or mechanism that might be responsive to linear movement. Further, the piston cylinder arrangements 21, 31 and 41 are understood to be movable relative to the reference base 53 and that any number of suitable ways could be devised for accomplishing that function. Further, it is contemplated that the piston display rather than being arranged horizontally could be arranged vertically, supported either from above or from below.

As explained above, the contacts of the sets 61 and 62 in FIGURE 1B are connected to the valves 24, 25, 34 and 35 in accordance with a ternary progression as illustrated specifically in FIGURE 2. Connection of the contacts thereof are not limited to conformation with the ternary progression shown in FIGURE 2, but might be connected in accordance with any other agreeable type of progression. In FIGURE 3 there is illustrated an arrangement for connecting and energizing the various sections of the digital positioner in accordance with a progression known alternatively as a reflected binary or gray binary progression. While it is obvious that such a pattern of connection provides less flexibility than the connection in accordance with the ternary progression, there may be some instances in which such a connection or pattern of connection is actually preferable.

The FIGURE 4 is illustrative of another type of control adaptable for use with the arrangement of FIGURE 1A. The circuit illustrated in FIGURE 4 is contemplated to be particularly adaptable to the output of certain available digital programming devices. Therein there is illustrated a shaft and coder drum 100 (illustrated laid out flat), and considered to be rotatable reversibly between the numerical indications 0 and 32. The shaft and coder drum illustrated have five conductive tracks 101, 102, 103, 104 and 105. The tracks 101 to 103, inclusive, are considered to be informational tracks and may be assigned the alternative designation of the A, B and C tracks, respectively. The tracks 104 and 105 are conductive tracks for providing a flow of negative and positive potentials which are selectively extended to areas of the tracks 101 to 103, inclusive. Associated with the shaft and coder drum are a plurality of conductive brushes 110 including the brushes 111, 112 and 113 corresponding to the tracks A, B and C, respectively, and the brushes 114 and 115 corresponding to the negative and positive potential tracks 104 and 105 on the drum. Negative and positive potentials are fed to the brushes 114 and 115, respectively, from the direct current source 120 via the conductors 118 and 119. A neutral or ground conductor 108 extends also from the direct current source 120 to provide a return for actuator elements connected in a matrix 130 with conductors extending from the brushes 111 to 113. In the matrix 130, conductive paths 131a and 131b, are completed via the conductor 121, conductive paths 132a and 132b are completed via the conductor 122, and conductive paths 133a and 133b are completed via the conductor 123.

The conductive path 131a includes a unidirectional conducting device 141a and an electrical actuator 151a arranged so as to complete a path between positive potential that may be on the conductor 121 and the neutral potential on the conductor 108. The conductive path 131b includes a unidirectional conducting device 141b and an electrical actuator unit 151b which are arranged so as to complete a conductive path from the neutral conductor 108 to negative potential on the conductor 121. The conductive paths 132a and 133a are arranged and constructed similar to that of conductive path 131a. The paths 132b and 133b are comprised and arranged similar to the path 131b. The electrical actuators 151a to 153a may be considered to be actuators for devices such as the four-way valves 24, 34 and 44 in the arrangement of FIGURE 1A and the electrical actuators 151b to 153b may be considered as the electrical actuating portions of the four-way valves such as those illustrated by the valves 25, 35 and 45 in the arrangement of FIGURE 1A.

It is to be noted that the shaft and coder drum 100 and specifically that the tracks 101 to 103 thereof are encoded in accordance with the ternary progression patterns set forth in FIGURE 2. It is to be understood that the shaft and rotor drum may also be encoded in any appropriate way and might, for example, be encoded according to the gray or reflected binary progression and in accordance with the pattern set forth in FIGURE 3.

FIGURE 5 illustrates another application of the principles of the present invention as particularly applied to a digital force mechanism. In FIGURE 5 there is illustrated an arrangement 200 including a piston and cylinder arrangement 210, a piston and cylinder arrangement 220, a piston and cylinder arrangement 230, and a piston and cylinder arrangement 240. The piston and cylinder arrangement 210 includes a cylinder 211 carrying therein a piston 212. The upper portion of the system is extended via a hydraulic conduit 213A to a three-way hydraulic valve 213 and the lower portion of the cylinder is connected by means of a hydraulic conduit 214A to a hydraulic valve 214. The piston and cylinder arrangement 220 includes a cylinder 221 and a piston 222, the upper portion of the piston being connected via a conduit 223A to a one-way hydraulic valve 223 and the lower portion of the cylinder being connected via a conduit 224A to the three-way valve 224. Control of the valve 223 is effected by means of a conductor and terminal 225 and valve 224 is controlled via a conductor and terminal 226. The piston and cylinder 230 includes a cylinder 231 carrying therein a piston 232, the upper portion of the cylinder being connected via a conduit 233A to a valve 233 and the lower portion of the cylinder being connected via a conduit 234A to a valve 234. Electrical control of the valve 233 is effected by means of the conductor and terminal 235 and operation of the valve 234 is effected by means of the conductor and terminal 236. The piston and cylinder 240 includes a cylinder 241 and a piston 242, the upper portion of the cylinder 241 being connected via a conduit 243A to a three-way valve 243 and the lower portion of the cylinder 241 being connected via the conduit 244A to a three-way valve 244. The valve 243 is operated via the conductor and terminal 245 and the valve 244 is operated via the conductor and terminal 246.

The valves 213, 214, 223, 224, 233, 234, 243 and 244 are each connected in addition to a hydraulic reservoir and pump 250 via the hydraulic conduits 251 and 252. In these cylinders 211, 221, 231 and 241, all of the pistons are formed on a common shaft which is terminated below the cylinder 241 in a force output linkage 255. The stroke of each piston in the series group is the same. However, the areas of the piston heads are proportioned according to the ternary progression. Specifically, assuming that the piston 212 has an area of unit value, the piston 222 would be selected to have an area of three unit values, the piston 232 would be selected to have an area of nine unit values, and the piston 242 would be selected to have an area of twenty-seven unit values. In this fashion, and assuming that the hydraulic pressure applied to the various piston heads is equal, the total force on the piston shaft and particularly on the operative end 255 thereof, will depend upon the one or ones of the cylinder and piston units 210, 220, 230 and 240 to be operated and the particular manner in which they are operated. Thus a compressive or a tensive force of varying digital amounts can be applied to the spring 56 thereby causing relative corresponding movement of the indicator 257 relative to the scale 258. To effect this purpose, it is of course necessary that the cylinders 211, 221, 231 and 241 be interconnected and that the group of the cylinders be connected to the reference platform 259 with the spring 256.

Considering for a moment the operational aspects of the force mechanism shown in FIGURE 5, in a normal circumstance, the control valves associated with each of the pistons are operated so that the piston chamber is in connection with the return line 251 extending to the reservoir and pump 250. Considering further the circumstance where the valve 213 is operated responsive to a signal being applied to the terminal 215, hydraulic fluid will then be applied from the hydraulic reservoir and pump 250 via the conduit 252, the conduit 213C, the valve 213 and the conduit 213A to the upper portion of the cylinder 211 thereby providing a pressure differential between the upper and lower faces of the piston face and exerting a compressive force in the piston shaft.

If instead of the valve 213 being operated, the valve 214 had been operated by a signal applied to the conductor 216, the hydraulic fluid under pressure would have been applied via the conduits 252, 214C, the valve 214 and the conduit 214A to the lower portion of the piston cylinder 211 thereby causing a pressure differential against the face of the piston 212 to introduce a tensive force into the shaft of the pistons. The same type of compressive and tensive force control can be exercised in each of the other cylinder piston units 220, 230 and 240 and by virtue of designated relationship between the areas of each of the pistons, the piston cylinder arrangements can be operated in a manner so as to present a digital type of force control. When the arrangement of FIGURE 5 is connected to a control circuit of the kind shown in FIGURE 1B and operated in accordance with a ternary progression, the arrangement of FIGURE 5 can be made to provide two-hundred forty-three digitally spaced force control points.

A specific arrangement wherein the digital force mechanism, as shown schematically in FIGURE 5, may be employed is illustrated in the arrangement of FIGURE 6. The arrangement illustrated is a hydraulic digital scale system which includes as its basic component the digital force mechanism 200 of FIGURE 5. Additionally, there is included in this arrangement a schematic representation of a digital controller 270 which transmits digital signals according to the ternary code set forth in FIGURE 2, for example, and hence operates the designated one of the valves in the unit 200 to impart the desired set-point-force to the output linkage 255. Further, the system includes the device which is to be weighed which in this circumstance might be the process storage tank 280 and a load cylinder system 290 and a controller 285. The load cylinder system as shown in FIGURE 6 includes the load cylinders 281, 282, 283 and 284 which are connected via a hydraulic conduit 295 to an impulse cylinder 296 into which the shaft from the force mechanism 255 is terminated. The load system cylinders 281 to 284 respond to the weight impressed on the cylinders and creates a pressure in the line 295 which is transmitted to the impulse cylinder 296. Thus at the impulse cylinder 296 is created a force corresponding to the weight of the process storage tank 280 supported by the load cylinders.

Giving consideration to the interplay between the force mechanism 200 and the impulse cylinder 296, it should be noted that the linkage 255 from the force mechanism 200 extends into the impulse mechanism 296. The impulse cylinder is in itself a piston device which operates against the force mechanism 200 via the shaft 255. The present arrangement is designed to provide a balance between the compressive forces applied at the opposite ends of the shaft 255.

As explained before, the digital computer operates the force mechanism 200 to a preferred set-point which then applies a force of a given dimension to the shaft 255. By the same token, the weight in the process storage tank 280 operates against the hydraulic load cylinders 281 to 284, inclusive, thereby to apply via the impulse line 295 hydraulic pressure so as to create on the face of the piston in the impulse cylinder 296 a force which is applied to the linkage 255. Means whereby a balance of forces between the opposite ends of the linkage 255 is achieved, is discussed hereinafter.

The controller 285 includes a variable switch 286 and a material supply 287. The variable switch 286 is connected to the material supply 287 via a control lead 288 and the material supply 287 is connected to the process storage tank 280 by a supply conduit 289. The variable switch 286 operates via the conductor 288 to direct the material supply 287 in the quantity of material provided by the conduit 289 to the process storage tank 280. To effect this control, the variable switch 286 is connected to the linkage 255 extending between the force mechanism 200 and the weight impulse cylinder 296. The manner of connection between the linkage 255 and the variable switch 286 includes a mechanism, for example, such as a rack and pinion gear 291 and a shaft 292. In the exemplary arrangement, the rack portion is directed to or is a part of the linkage 255, with the pinion gear portion thereof being connected via the shaft 292 to the variable switch 286. In this arrangement, movement of the linkage 255 introduces a corresponding movement to the variable switch 286 thereby providing the desired kind of control.

By way of example, should the digital computer at the start of a processing operation indicate to the digital scale that the process storage tank should be of a selected set-point weight corresponding to a full storage tank, the force mechanism 200 would be operated accordingly, to apply to the linkage 255 a pressure in the amount of the set-point. At this time, should the process tank 280 be substantially empty so that the pressure applied via the conduit 295 to the weight impulse cylinder 296 is relatively low, the set-point pressure in the force mechanism 200 will overcome the force of the weight impulse cylinder 296 and permit movement of the linkage 255 to the extent of the stroke of any of the cylinders making up the force mechanism 200. Accordingly, the rack mechanism of the rack and gear will move causing the gear also to move with it and apply a rotational point of force to the shaft 292 in a clockwise direction indicating to the variable switch 286 that the tank is empty and needs to be filled. Accordingly, the material supply source 287 will be operated via the conductor 288 to cause a flow of material via the conduit 289 to the hopper 280. Thus the filling operation of the hopper 280 is commenced.

As the hopper is filled with material, the force applied to the load cylinders 281, 282, 283, and 284 increases and with it the hydraulic pressure in the line 295 increases. Accordingly, the force in the weight impulse cylinder 296 increases thereby building in the linkage 255 a force opposing the set-point force in the force mechanism 200. As the set-point force and the weight impulse cylinder force approach a point of balance, the linkage 255 is moved from its extreme stroke position, towards its medium position in the piston cylinders of the force mechanism, thereby causing a corresponding movement of the rack and gear mechanism 291. The gear will move so as to apply to the shaft 292 a counter-clockwise motion which will indicate to the variable switch 286 that the storage tank 280 is almost full and that the flow from the material supply 287 should be decreased to a lesser rate. This process continues until balance is achieved between the force on the linkage 255 supplied from the force mechanism 200 and the weight impulse cylinder 296 at which time the shaft 292 extending to the variable switch 286 will be restored to its neutral or off position. At this time flow of the material from the material supply 287 will be stopped. The variable switch 286 may then be actuated to provide a signal to a central controller that the process storage tank is filled to the direction of the digital computer and the system is prepared to complete another step in the operation.

The variation of the application of the force mechanism of FIGURE 5 is illustrated in the digital pressure regulator of FIGURE 7. Therein the digital pressure regulator 300 is shown schematically to comprise the force mechanism 200 including the linkage 255 extending to a force impulse cylinder 296 and having associated with the linkage 255 a rack and pinion gear structure 291. The pinion gear portion thereof is connected to a shaft 292 which extends to the regulator portion of the embodiment. Thus far, the structure is essentially that as set forth with regards to the digital scale in FIGURE 6. It is to be understood that the force mechanism 200 is controlled from a digital computer such as that 270 shown in FIGURE 6.

In the arrangement of FIGURE 7, the shaft 292 controls a valve 310 intermediate an input conduit 320 and an output conduit 330. The input conduit 320 is supplied from a pressure fluid reservoir 325. The output conduit 330 can extend to a pressure flow arrangement for which it is desired to provide a regulated pressure fluid flow. Connected between the output conduit 330 and the impulse cylinder 296 is a pressure conduit 335.

Considering the operation of the digital pressure regulator in FIGURE 7 and assuming that the force mechanism 200 has been operated from a digital programmer to a preferred set-point force, and assuming that the flow pressure designated by the set-point force is above that actually provided in the output of the conduit 330, the shaft 255 will be moved in a downward direction thereby causing operation of the pinion and rack to rotate the shaft 292 in the counterclockwise direction. Accordingly, the valve 310 will be opened to permit an increased flow from the conduit 320 to the conduit 330. Accordingly, the feedback pressure through the conduit 335 will be increased and the force applied to the linkage 255 from the impulse cylinder 296 will increase. This will cause the shaft 292 to move in the clockwise direction until the point of balance is achieved whereby it will be indicated that the actual pressure in the output conduit 330 corresponds to the preferred set-point pressure designated at the force mechanism 200.

If at any time during the course of the operation of the digital pressure regulator the input pressure on the conduit 320 should change, for example decrease, a corresponding decrease in pressure in the output conduit 330 will be experienced whereupon the force contributed from the force mechanism 296 to the linkage 255 will also decrease and permit movement of the linkage 255 and the rack and pinion gear 291 in the counterclockwise direction for opening the valve 310 and increasing the pressure in the output conduit 330. Accordingly, the pressure to the impulse cylinder 296 is increased and the opposing force on the linkage 255 is increased so that the rack and pinion gear 291 is operated to close the valve 310. From this pattern it is easy to understand that the digital pressure regulator arrangement of FIGURE 7 constantly hunts around the set-point thereby to achieve in the output conduit 330 an average pressure corresponding to the set-point of the force mechanism 200. In this manner, the arrangement of FIGURE 7 is digitally controlled to provide a corresponding digitally regulated average pressure.

The arrangement of FIGURE 8 shows a digital torque control utilizing the principles of the invention. Therein is illustrated an arrangement including a torque drive 450, a clutch 460 of the eddy current type and a torque load 470. The clutch 460 includes a drive member 461 connected directly to the constant torque motor 450 via the shaft 451, and a driven member 462 connected directly to the load device 470 via the shaft 468. As is true in eddy current clutch practice, the amount of torque distributed from the motor 450 to the load 470 is determined by the slip or magnetic coupling between the drive member 461 and the driven member 462 of the clutch 460. For purposes of controlling the magnetic flux, the drive member 461 is provided with clutch windings 463, 464, 465, 466 and 467.

In considering the electrical connections to the windings in the arrangement of FIGURE 8, it is easiest to consider the circuit arrangement shown in FIGURE 4 and specifically the conductors 108, 121, 122 and 123. As considered in the arrangement of FIGURE 4, the conductor 108 of FIGURE 8 has thereon a ground potential or neutral potential and the conductors 121 to 125, inclusive, of FIGURE 8 have selectively applied thereto potentials that are positive and negative with respect to that on the conductor 108. Proceeding then, one end of each of the windings is connected to a brush-slip ring arrangement 452 which is returned to the neutral ground potential on a conductor 108. The other end of the winding 463 is connected via the brush-slip ring arrangement 453 to the conductor 121, the other end of the winding 464 is connected via the brush-slip ring arrangement 454 to the conductor 122, the other end of the coil winding 465 is connected via the brush-slip ring arrangement 455 to the conductor 123, the other end of the coil 466 is connected via the brush-slip ring arrangement 456 to the conductor 124 and the other end of the winding 467 is connected via the brush-slip ring arrangement 457 to the conductor 125. As explained with regards to the circuit of FIGURE 4, the conductors 121, 122, 123, 124 and 125 are selectively controlled to have applied thereto potentials positive and negative with respect to that on the conductor 108 in accordance with the code established on the shaft and coder drum 100. In the arrangement of FIGURE 4, the code thereon is in accordance with a ternary progression pattern.

The coils 463, 464, 465, 466 and 467 are arranged and wound so that the coil strings provided thereby are proportioned according to the established pattern. Accordingly, and by way of example, in the circumstance wherein the clutch winding 463 when energized would cause a field strength providing a torque of ten foot pounds to the driven member 462, the clutch winding 464 would be arranged to provide a torque of thirty foot pounds, the clutch winding 465 would be arranged to provide a torque of ninety foot pounds, the clutch 466 would be arranged to provide a torque of two-hundred seventy foot pounds and the clutch winding 467 would be arranged to provide a torque of eight-hundred ten foot pounds. These torques are distributed directly to the load 470.

Illustrating the manner of use, assuming that the conductor 121 has a negative potential thereon, the conductor 122 has a negative potential therein and the conductor 123 has a positive potential thereon and the conductors 124, 125 have no potential thereon, the windings will be energized so that the winding 463 provides a negative ten fot pounds of torque, the winding 464 provides a minus thirty foot pounds of torque and the winding 465 provides a plus ninety foot pounds of torque. The composite torque applied to the load 470 would then be fifty foot pounds. If thereafter the potentials were adjusted so that the conductors 121, 122 and 123 had positive potentials thereon and conductors 124 and 125 had no potentials thereon, then the total torque on the load 470 would be the sum of ten foot pounds, thirty foot pounds and ninety foot pounds or one-hundred thirty foot pounds. Accordingly, by selective operation of the control in the digital programmer, the torque in the output load 470 can be digitally controlled in the example shown from zero foot pounds to 1,210 foot pounds over control points digitally spaced by ten foot pound increments.

In the arrangement of FIGURE 9, there is shown a variable amplitude digital feeder which is responsive to impacts provided thereto from a multiple solenoid. Specifically, the arrangement 500 thereof includes a material supply bin 510 which is mounted, as shown schematically, on a spring 520 which is operated on by a multiple cylinder 530. The multiple solenoid 530 is mounted so as to provide an impacting force between the spring 520 and the bin 510 so as to cause a rocking action of the bin and resulting discharge of material therefrom. The multiple solenoid 530 is made up of a plurality of windings specifically, 531, 532, 533 and 534, as illustrated in FIGURE 9. All of the windings 531 to 534 are returned to ground or neutral potential on conductor 540 and the other ends of the windings are applied to sources of pulsating signals which are selectively positive and negative relative to the potential on the conductor 540. Specifically, the winding 531 is connected at its other end to a conductor 541, the winding 532 is connected at its other end to a conductor 542, the winding 533 is connected at its other end to a conductor 543 and the winding 534 is connected at its other end to a conductor 544. The conductor 541 is connected to a contact and terminal pair 551, the conductor 542 is connected to a contact and terminal pair 552, the conductor 543 is connected to a contact and terminal pair 553, and the conductor 544 is connected to a contact and terminal pair 554. The positive ones of the contact pairs 551 to 554, inclusive, are connected to a positive half-wave generator 555 and the negative ones of the contact pairs 551 to 554, inclusive, are connected to a negative half-wave generator 556. The contacts of the contact and terminal pairs 551 to 554 are selectively operated to engage either one of the positive or negative terminals associated therewith by means of actuators such as illustrated in the control arrangement of FIGURE 4. Specifically, and by way of example, the contact and terminal pair 551 may be operated by the actuator 152 to engage the positive terminal thereof extending to the half-wave generator 555 or it may be actuated by the actuator 152 to engage the negative terminal extending to the negative half-wave generator 556.

In the multiple solenoid device 530, the windings 531, 532, 533 and 534 are proportioned so that if the winding 531 upon operation from either of the generators 555 or 556 is considered to provide ten ampere turns of magnetomotive force, the winding 532 would provide thirty ampere turns, the winding 533 would provide ninety ampere turns and the winding 534 would provide two-hundred seventy ampere turns. Illustrating the operation of the arrangement in accordance with the invention and considering for a moment that the actuators 151a to 154a and 151b to 154b are operated in accordance with the arrangement shown in FIGURE 4, then upon the shaft coder drum 100 arriving at a position, for example, 11, the actuators 151b, 152a and 153a would be actuated thereby providing the multiple solenoid 530 with a negative ten ampere turns, a positive thirty ampere turns and a positive ninety ampere turns or the composite magnetomotive force of one-hundred ten ampere turns. The solenoid would then be operated in accordance with each half-wave provided thereto to impact the bin 510 against the action of the spring 520 and shake selective amounts of material from the bin 510. The arrangement shown in FIGURE 9 is capable of providing impact forces varying over a range of one-hundred twenty-one digitally spaced force increments.

Inasmuch as the devices of FIGURE 8 and FIGURE 9 are magnetically driven, it is understood that the effective number of control points is half that available from the other arrangements described herein because magnetic fields do not in themselves know a positive or negative direction so that the magnetic field produced by the arrangements can be considered only as to magnitude and not as to correction.

The arrangement of FIGURE 10 illustrates a digital rotary positioner. Specifically, the position of the shaft 641 and the indicator 642 connected thereto is controlled by means of the series joined differential gear units 600, 605, 610 and 615. The units 600 and 605 are interlinked by a transmission shaft 603, the units 605 and 610 are interlinked by a transmission shaft 608 and the units 610 and 615 are interlinked by a transmission shaft 613. The input to the differential gear unit 600 is via a drive shaft 601 extending from the reversible rotary torque motor 602, the input to the differential gear unit 605 is via the drive shaft 606 extending from the reversible rotary torque motor 607, the input to the differential gear unit 610 is via the drive shaft 611 extending from the reversible torque motor 612, and the input to the differential gear unit 615 is via the drive shaft 616 extending from the reversible rotary torque motor 617. The reversible rotary torque motors 602, 607, 612 and 617 may be solenoids, for example, arranged to rotate one-half of a revolution in one direction when energized with a positive potential, to rotate one-half of a revolution in the opposite direction when energized with a negative potential and to restore itself to its neutral position when deenergized. Thus each of the drive shafts 601, 606, 611 and 616 normally rotate but one-half of a revolution in either the clockwise or counterclockwise direction in response to operation of a corresponding reversible rotary torque motor. The gears in each of the differential gear units 600, 605, 610 and 615 are arranged to establish a specific gear ratio between the input gear on the drive shaft and the output gears on the transmission shafts. Thus in the differential gear unit 600, the gear ratio between the input gear and the output gear may be 80:1, in the differential gear 605 the ratio between the drive shaft gear and the transmission shaft gears may be 80:3, in the differential gear unit 610 the ratio between the drive shaft gear and the transmission shaft gears may be 80:9, and in the differential gear unit 615 the ratio between the drive shaft gear and the transmission shaft gears may be 80:27. The reversible rotary torque motors 602, 607, 612 and 617 are considered to be connected, for example, to the circuitry illustrated in FIGURE 4 wherein the motors are connected to the neutral or ground conductor 108, the motor 602 is connected to the conductor 121, the motor 607 is connected to the conductor 122, the motor 612 is connected to the conductor 123 and the motor 617 is connected to the conductor 124.

The differential gear units are arranged to either add or subtract the motion applied thereto through the input gears and the output gears. Thus in one circumstance where each of the conductors 121 to 124, inclusive, have negative potentials thereon, the drive shafts in the differential gear units would be operated so that the shaft 641 and the indicator 642 thereon would be rotated one-half of a revolution or $^{40}\!/_{80}$ of a revolution in the counterclockwise direction. In the other extreme where each of the conductors 121 to 124, inclusive, have positive potentials thereon, the drive shafts and differential gear units would be operated so that the shaft 641 and the positioner 642 would be rotated one-half of a revolution or $^{40}\!/_{80}$ of a revolution in the clockwise direction. By various operational combinations of the conductors 121 to 124 between their positive and negative potentials, it will be seen that the shaft 641 and the positioner 642 can be selectively operative through eighty incrementally spaced rotary positions. When connected to a simple flutter valve, this would mean that the valve itself could be operated through eighty flow positions from full closed to full open.

By way of review, it is to be noted that the arrangements of FIGURES 1 and 4 to 10, inclusive, illustrate flow controls, linear distance controls, rotary distance controls, force controls, pressure controls, speed controls and torque controls. These are meant to illustrate the various dynamical operations that can be performed in the utilization of the principles of the present invention. Further, it is to be noted that each of the arrangements illustrated includes a user or operator of the dynamical function performed by a machine and usually a load device of some type. In each of the arrangements illustrated there are a plurality of sources of dynamical control such as valves, pistons, gears and electrical windings which can be considered to be dynamical suppliers, and there are means intermediate the dynamical operator and the dynamical suppliers for accumulating the dynamical functions of the suppliers and transmitting these functions to the operator. It has been explained that the dynamical suppliers are and may be controlled from digital circuits such as stepping switches or digital programmers. The code employed in the case of a digital programmer may be that utilized by the particular type of digital programmer employed and in the occasion of the present invention, might be, for example, a reflected or gray binary progression system or a ternary progression system.

From the foregoing, it is clear that there has been provided new, improved and unique means for achieving easy control of an analog type of dynamical operator directly in accordance with the output of a digital controller in a manner requiring a minimal number of physical control elements while at the same time tending to achieve the multiplicity of controls generally associated with analog devices. Specifically, it is clear that there has been provided a system including a digital controller for directing the operation of a dynamical operator wherein the controller can provide $3^n$ discrete incremental control signals, an arrangement including a series of $n$ number ternary dynamical sources which are selectively operated individually and in combination to provide $3^n$ operational combinations, control means between the digital controller and the series of dynamical sources for operating the sources into any one of the $3^n$ operational combinations in accordance with the corresponding ones of the $3^n$ control signals from the digital controller, and means for accumulating the output of the dynamical sources and applying the outputs thereof to the dynamical operator to be controlled. In the arrangement considered, the fundamental element that provides for the advantage of the present system is the ternary device which can be operated from a neutral position to either a positive vector output or a negative vector output.

In the arrangement considered, the dynamical sources in the series are arranged to provide vector outputs that are three times the output of a next dynamical source in the series. By utilization of such a device, it is possible to control a dynamical operator of the analog type easily and accurately through a plurality of digital positions directly in accordance with the output of the digital controller.

The specific arrangements described herein are meant to illustrate the general principles of the invention and it is understood that other variations and modifications of these arrangements may be made by those skilled in the art. It is intended to cover in the appended claims all such variations and modifications which fall within the true spirit and scope of the invention.

What is claimed is:

1. In a system including a digital controller for rendering control direction to a dynamical operator wherein the digital controller provides not less than $2^n$ discrete incremental control signals; the combination comprising a series of $n$ number mechanical-analog vector suppliers, each of said vector suppliers in said series being a selectively operative dynamical ternary device thereby providing $3^n$ possible operational combinations for said $n$ number of suppliers, each of said vector suppliers in one ternary condition providing a mechanical-analog vector output different from the mechanical-analog vector output of the other of said vector suppliers, means for cumulating the vector outputs of said series of vector suppliers thereby to provide to said dynamical operator cumulative mechanical-analog vectors corresponding to selected ones of said $3^n$ possible operational combinations wherein any one of said cumulative mechanical-analog vectors differs from every other cumulative mechanical-analog vector in magnitude by at least a discrete increment, and connector means between the output of said digital controller and said vector suppliers for selectively operating said suppliers in accordance with any one of said discrete increment control signals so as to provide correlation with the corresponding one of said discrete incremental cumulative mechanical-analog vectors at said cumulating means whereby the selection of any one of said control signals in said digital controller produces a corresponding cumulative mechanical-analog vector at said dynamical operator.

2. In a system including a digital controller for rendering control direction to a dynamical operator wherein the digital controller provides at least $2^n$ discrete incremental control signals; the combination comprising a series of $n$ number mechanical-analog vector suppliers, each of said vector suppliers in said series being a selectively operative dynamical ternary device thereby providing $3^n$ possible operational combinations for said $n$ number of suppliers, any one of said suppliers in said series supplying in one ternary condition a zero output and supplying in another ternary condition a mechanical-analog vector output that is equal in magnitude and opposite in direction to its mechanical-analog vector output in the final ternary condition, said mechanical-analog vector output of any one of said suppliers being of a magnitude three times that of the mechanical-analog vector output of the next preceding vector supplier in said series, means for cumulating the vector outputs of said vector suppliers thereby to provide to said dynamical operator cumulative mechanical-analog vectors corresponding to $3^n$ possible operational combinations wherein any one of said cumulative mechanical-analog vectors differs from every other cumulative mechanical-analog vector in magnitude by at least a discrete increment, and connector means between the output of said digital controller and said vector suppliers for selectively operating said suppliers in accordance with any one of said discrete increment control signals so as to provide correlation with the corresponding one of said discrete incremental cumulative mechanical-analog vectors at said cumulating means, "whereby" the selection of any one of said control signals in said digital controller produces a corresponding cumulative mechanical-analog vector at said dynamical operator.

3. In a system including a digital controller for rendering control direction to a dynamical operator wherein the digital controller provides $2^n$ discrete incremental control signals; the combination comprising a series of $n$ number mechanical-analog vector suppliers, each of said vector suppliers in said series being selectively operative from a neutral condition into a first condition and into an opposing second condition thereby providing $3^n$ possible operational combinations for said $n$ number of suppliers, any one of said suppliers in said series supplying in said first and second conditions mechanical-analog vector outputs of equal magnitude and opposite direction, and supplying in said first and second conditions an operational mechanical-analog vector output of a magnitude $2^{n-1}$ of the operational mechanical-analog vector output of the next preceding vector supplier in said series, means for cumulating the mechanical-analog vector outputs of said series of vector suppliers thereby to provide to said dynamical operator any one of $2^n$ cumulative mechanical-analog vectors corresponding to $2^n$ selected ones of said $3^n$ possible operational combinations wherein any one of said cumulative mechanical-analog vectors differs from every other cumulative mechanical-analog vector in magnitude by at least a discrete increment, means for transmitting said cumulative mechanical-analog vectors to said operator, and connector means between the output of said digital controller and said dynamical vector suppliers for selectively operating said suppliers in accordance with any one of said $2^n$ discrete increment control signals so as to provide correlation with the corresponding one of said $2^n$ discrete incremental cumulative mechanical-analog vectors at said cumulating means, whereby the selection of any one of said control signals in said digital controller produces a corresponding cumulative mechanical-analog vector at said dynamical operator.

4. In a system including a digital controller for rendering control direction to an operator controlled in accordance with the energy transmitted thereto wherein the digital controller provides $3^n$ discrete incremental control signals; the combination comprising a series of $n$ number energy-analog vector suppliers, each of said energy-analog vector suppliers in said series being selectively operative from a neutral condition into a first condition and into an opposing second condition thereby providing $3^n$ possible operational combinations for said $n$ number of suppliers, means for selectively operating said suppliers between said neutral condition and said first condition and said second condition from said digital controller, any one of said suppliers in said series supplying in said first and second conditions vector outputs of equal magnitude and opposing direction, and supplying in said first and second conditions an operational energy-analog vector output of a magnitude three times that of the operational energy-analog vector output of the next preceding energy-analog vector supplier in said series, means for cumulating the vector outputs of said series of vector suppliers thereby to provide to said energy operator any one of $3^n$ cumulative energy-analog vectors corresponding to said $3^n$ possible operational combinations wherein any one of said cumulative energy-analog vectors differs from every other cumulative energy-analog vector in magnitude by at least a discrete increment, means for transmitting said cumulative vectors to said operator and connector means between the output of said digital controller and said operating means for said energy-analog vector suppliers for operating said suppliers in accordance with any one of said $3^n$ discrete increment control signals so as to provide correlation with the corresponding one of said $3^n$ discrete incremental energy-analog cumulative vectors at said cumulating means, whereby the selection of any one of said control signals in said digital controller transmits a corresponding cumulative energy-analog vector to said energy operator.

5. In the system set forth in claim 4 wherein the energy operator is a torque load, the combination including an eddy current clutch device provided with a rotatable input member and a rotatable output member and a series of $n$ number of inductive windings mounted for rotation on said input member for controlling electromagnetically the torque coupling between said members, a torque motor for rotatably driving said input member, means for selectively and reversibly energizing said windings in accordance with control signals from the digital controller, wherein said inductive windings in rotation on said input member in conjunction with said means for energizing said windings comprise said energy vector suppliers, wherein said control signals and said digital controller comprise the means for selectively operating said suppliers, wherein said output member of said eddy current clutch device comprises said cumulator, and wherein said output member is connected to said torque load by means of a shaft for transmitting the cumulative torque vectors to the torque load.

6. In a system including a digital controller for rendering control direction to an operator controlled in accordance with the force transmitted thereto wherein the digital controller provides $3^n$ discrete incremental control signals, the combination comprising a series of $n$ number force-analog vector suppliers, each of said force-analog vector suppliers in said series being selectively operative from a neutral condition into a first condition and into an opposing second condition thereby providing $3^n$ possible operational combinations for said $n$ number of suppliers, means for selectively operating said suppliers between said neutral condition and said first condition and said second condition from said digital controller, any one of said suppliers in said series supplying in said first and second conditions vector outputs of equal magnitude and opposing direction, and supplying in said first and second conditions an operational force-analog vector output of a magnitude three times that of the operational force-analog vector output of the next preceding force-analog vector supplier in said series, means for cumulating the vector outputs of said series of vector suppliers thereby to provide from said $3^n$ possible operational combinations corresponding $3^n$ cumulative force-analog vectors wherein any one of said cumulative force-analog vectors differs from every other cumulative force-analog vector in magnitude by at least a discrete increment, means for transmitting said cumulative vectors to said operator, and connector means between the output of said digital controller and said operating means for said force-analog vector suppliers for selectively operating said suppliers from said controller in accordance with any one of said $3^n$ discrete increment control signals so as to provide correlation with the corresponding one of said $3^n$ discrete incremental force-analog cumulative vectors at said cumulating means, whereby the selection of any one of said control signals in said digital controller transmits a corresponding cumulative force-analog vector to said force operator.

7. In the system set forth in claim 6 wherein the force operator is a force bar, the combination including a fixed member, a movable member, a series of $n$ number of double piston cylinders mounted between said members for controlling the force on said movable member, a reservoir providing fluid for said pistons at a predetermined pressure, and a series of $n$ number of pairs of switch-valves each pair selectively operable in accordance with the control signals from the digital controller for applying and relieving fluid pressure in the corresponding double piston cylinder, wherein said pistons comprise said force vector suppliers, wherein said reservoir in conjunction with said switch-valves comprise the means for selectively operating said suppliers, wherein said movable member comprises said cumulator and wherein said movable member is joined rigidly by means of a locking device to said force bar for transmitting thereto the cumulative force vectors.

8. In a system including a digital controller for rendering control direction to an operator controlled in accordance with the amount of movement applied thereto wherein the digital controller provides $3^n$ discrete incremental control signals, the combination comprising a series of $n$ number of movement-analog vector suppliers, each of said movement-analog vector suppliers in said series being selectively operative from a neutral condition into a first condition and into an opposing second condition thereby providing $3^n$ possible operational combinations for said $n$ number of suppliers, means for selectively operating said suppliers between said neutral condition and said first condition and said second condition from said digital controller, any one of said suppliers in said series supplying in said first and second conditions vector outputs of equal magnitude and opposing direction, and supplying in said first and second conditions an operational movement-analog vector output of a magnitude three times that of the operational movement-analog vector output of the next preceding movement vector supplier in said series, means for cumulating the vector outputs of said series of vector suppliers thereby to provide from said $3^n$ possible operational combinations a corresponding $3^n$ cumulative movement-analog vector wherein any one of said cumulative movement-analog vectors differs from every other cumulative movement-analog vector in magnitude by at least a discrete increment, means for transmitting said cumulative vectors to said operator, and connector means between the output of said digital controller and said operating means for said movement vector suppliers for selectively operating said suppliers from said controller in accordance with any one of said $3^n$ discrete increment control signals so as to provide correlation with the corresponding one of said $3^n$ discrete incremental movement-analog cumulative vectors at said cumulating means, whereby the selection of any one of said control signals in said digital controller transmits a corresponding cumulative movement-analog vector to said movement operator.

9. In the system set forth in claim 8 wherein the movement operator is a member reversibly rotatable through a single revolution, the combination including a fixed member, said rotatable member, a series of $n$ number of differential gear units each including a drive shaft and a pair of transmission shafts, means joining said differential gear units in series between said fixed member and said rotatable member, and a series of $n$ number of reversible motor units connected to said corresponding drive shafts each selectively operable in reversible half revolutions in accordance with the control signals from the digital controller, wherein said differential gear units comprise said movement vector suppliers, wherein said motor units comprise the means for selectively operating said suppliers, wherein said series connection of said differential units comprises said cumulator and wherein said rotatable member has transmitted thereto the cumulative movement vectors.

10. A digital scale system comprising a digital force mechanism for establishing a measure of weight to be achieved, a counter force mechanism establishing a counter force in the measure of the weight achieved, a reservoir of material available for influencing the achieved weight, and a control device responsive to said set force being greater than said achieved counter force for causing said material supply to influence said achieved weight; said digital force mechanism comprising a series of $n$ number of ternary piston devices, thereby providing $3^n$ possible operational combinations, each of said ternary piston devices being supplied from a constant pressure source and being operative from a neutral position in one direction for applying a force in the corresponding direction and being operative from the neutral position in the opposite direction for applying a corresponding force in that opposite direction, said ternary piston devices being connected in series between a fixed member and a movable member thereby to provide to the movable member $3^n$ possible operating forces; said counter force mechanism comprising a piston arrangement operated upon in accordance with the weight of the arrangement to be controlled, the piston of said weight detection device being connected to said movable member thereby to provide to said movable member the force countering said established force whereby said moving member is susceptible to movement when the set force and the counter force are unbalanced thereby to provide control to said control device.

11. In a system including a digital controller for rendering control direction to an operator controlled in accordance with the force transmitted thereto wherein the digital controller provides $3^n$ discrete incremental control signals, the combination comprising a series of $n$ number of ternary piston devices, each of said piston devices in said series being selectively operative from a neutral condition into a first condition and into an opposing second condition thereby providing $3^n$ possible operational combinations therefrom, means including a constant pressure reservoir of fluid for selectively operating said devices between said neutral position and said first condition and said second condition from said digital controller, each of said ternary piston devices providing a force-analog output different from the force-analog output of the other of the piston devices, said series of ternary piston devices being mounted between a pair of members movable relative to one another thereby to provide an output of $3^n$ cumulative force-analog vectors corresponding to said $3^n$ possible operational combinations, wherein any one of said cumulative vectors differs from every other force-analog vector in magnitude by at least a discrete increment, and connector means between the output of said digital controller and said dynamical piston devices for selectively operating said devices in accordance with any one of said $3^n$ discrete incremental control signals so as to provide correlation with the corresponding one of said $3^n$ discrete incremental force-analog vectors at said pair of movable members, whereby the selection of any one of said control signals in said digital controller produces a corresponding force-analog vector at said movable member.

References Cited by the Examiner
UNITED STATES PATENTS

| | | | |
|---|---|---|---|
| 2,010,158 | 8/35 | Kleinschmidt et al. | 340—154 |
| 2,398,997 | 4/46 | Berry et al. | 121—38.3 |
| 2,916,205 | 12/59 | Litz | 235—201 |
| 2,931,340 | 4/60 | White | 91—167 |
| 3,050,251 | 8/62 | Steele | 235—152 |

FOREIGN PATENTS

| | | |
|---|---|---|
| 1,012,523 | 4/52 | France. |
| 873,782 | 7/61 | Great Britain. |

LEO SMILOW, *Primary Examiner.*

K. J. ALBRECHT, LEYLAND M. MARTIN, *Examiners.*

UNITED STATES PATENT OFFICE
CERTIFICATE OF CORRECTION

Patent No. 3,162,365 December 22, 1964

Terrence Gizeski

It is hereby certified that error appears in the above numbered patent requiring correction and that the said Letters Patent should read as corrected below.

Column 2, lines 34 and 39, for "$2^{n-1}$", each occurrence, read -- $2^n-1$ --; column 3, lines 53 to 55, the formula should appear as shown below instead of as in the patent:

$$S_x = \frac{3^x-1}{3^n-1} \cdot \frac{S_t}{3}$$

column 6, line 10, for "conduition" read -- condition --; column 12, line 27, for "fot" read -- foot --; column 16, line 9, for '"whereby"' read -- whereby --; line 38, after "said" insert -- dynamical --; lines 39 and 40, strike out "dynamical".

Signed and sealed this 29th day of June 1965.

(SEAL)
Attest:

ERNEST W. SWIDER
Attesting Officer

EDWARD J. BRENNER
Commissioner of Patents